2,865,876

LOW-WATER-LOSS CEMENT COMPOSITION AND METHOD OF FORMING A SLURRY OF THE SAME

Platho P. Scott, Jr., Tulsa, Okla., assignor to Pan American Petroleum Corporation, a corporation of Delaware No Drawing. Application November 30, 1953
Serial No. 395,319

12 Claims. (Cl. 260—29.6)

This invention relates to hydraulic cement compositions and is directed particularly to a hydraulic low-water-loss cement. Specifically, it is directed to a low-water-loss cement composition useful for cementing deep wells and having especially desirable properties, in addition to retaining its low-water-loss characteristics over a wider and higher temperature range than most low-water-loss agents heretofore known.

The behavior of pumpable, water slurries of various hydraulic cements under unusual conditions of temperature and pressure, such as those encountered during the cementing of oil wells, has been the subject of research investigations of a number of years. It has been observed that most slurries of water and hydraulic cement, when placed in contact with a porous medium, such as certain subterranean formations encountered during cementing operations in wells, tend to lose part of their content of water into the porous medium. As a result the slurry may lose its fluidity and cease to flow under the placement pressure available, forming in narrow passages a bridge or obstruction which it may be impossible to break.

Low-water-loss cement slurries, on the other hand, tend to retain their slurry water, even when forced against porous surfaces or formations under substantial differential pressures. They are much less apt to form a bridge in confined passages during placement under pressure and/or set prematurely.

Due to the numerous chemical reactions occurring upon the hydration and setting of hydraulic cement compositions, however, only a comparatively few substances have been found capable of imparting low-water-loss properties to cement slurries. The number of such agents is still further reduced if a very low water-loss ratio is required, or if the strength requirements of the set cement are high. Some effective materials are compatible only with a limited range of cement compositions; or they may cause flocculation of the slurry; or they may operate as low-water-loss materials only within limited ranges of temperature. In particular, most agents which are effective at ordinary room temperature become ineffective at the higher temperatures encountered in deep oil wells. Still further considerations limiting the use of some low-water-loss materials are the sulfate resistance and the shrinkage properties and permeability of the set cement.

It is accordingly a primary object of my invention to provide a novel and improved hydraulic cement composition having low-water-loss properties, in addition to other desirable characteristics. Other and more specific objects are to provide an improved hydraulic cement composition of the low-water-loss type which is effective over a wider range of temperatures than most known compositions, at the same time that it also possesses such other desirable properties as high set strength, compatibility with different cements, ease of mixing, low shrinkage, low fluid permeability and good sulfate resistance. Other and further objects, uses, and advantages will become apparent as the description proceeds.

It has now been found that a superior cement composition embodying all of the foregoing properties can be provided by incorporating, either in the dry cement or in the slurry of cement in water, a minor proportion of a water-soluble sulfonated polystyrene resin or water-soluble salt of such resin. The styrene polymer may have a molecular weight in the range between 10,000 and 400,000 and preferably has a molecular weight of at least 50,000 as determined by the Staudinger method. It is sulfonated to the extent of an average of between about 0.7 and about 2.0 sulfonic acid groups per styrene unit. Typical resins used in my invention contain 1.2 sulfonic acid groups per styrene unit and possess a molecular weight of about 70,000. The sulfonated polystyrene resin may be employed directly without first forming a salt thereof, but it is preferably utilized in the form of the water-soluble salt of an alkali metal, an alkaline earth metal, ammonia, or an amine, especially a tertiary amine or a quaternary ammonium compound.

Such resin materials are currently being produced and sold commercially by the Monsanto Chemical Company under the trademark of the Lustrex X-700 Series of water-soluble resins. Lustrex X-770, for example, is the ammonium salt of a sulfonated polystyrene of molecular weight about 70,000, sulfonated to the extent of about 1.2 sulfonic acid groups per styrene unit. It is an off-white or yellowish-white material, consisting of finely divided particles all smaller than 40-mesh and 90% smaller than 100-mesh.

This material is different from a great many agents heretofore utilized in cements for low-water-loss properties in that it is water-soluble and may therefore conveniently be added to the cement mixing water prior to addition of the dry cement to form a slurry. Alternatively, the dry resin powder may be mixed with the dry cement before the addition of slurry water.

The concentration in which these resins are most effective for reducing water loss from cement slurries varies from about 0.5% to about 5%, based on the weight of the dry cement or the dry bulk solids to which water is added in forming a slurry, and is typically 1% or 2%. The upper limit of 5%, however, does not appear to be particularly critical, since the primary effect of large percentages of the sulfonated polystyrene is to make some further minor reduction of fluid loss or to extend the range of temperatures over which the additive is effective. Other cement properties are not affected adversely to any great extent.

In the examples and tests to be described, the sulfonated polystyrene resin employed was the ammonium salt, in either a crude or pure form, respectively designated Lustrex X-770-C or Lustrex X-770-P, of a polystyrene of molecular weight about 70,000 sulfonated to the extent of about 1.2 sulfonic acid groups per styrene unit. The crude Lustrex X-770-C was about 80% active salt, the inactive ingredients being inert water-soluble inorganic salts which were slightly detrimental in some cement compositions but not in others. The pure Lustrex X-770-P was 100% active salt, substantially free of inorganic salts.

The powdered Lustrex resin was added to cement compositions in one of two ways, respectively referred to as a "dry mix" and a "wet mix." In the dry mix the powdered resin was first thoroughly mixed with the dry cement bulk solids, and water was then added to form a slurry. In the wet mix the Lustrex was first dissolved in water, and the resulting solution was added to the bulk cement solids to form a slurry. The wet-mix method of addition was generally found to be preferable, in most cases giving a somewhat lower measured water loss than the same amount of resin added dry to the bulk cement solids.

The water loss of each of the cement slurries was tested with one or the other of two different filter presses operated at 100 pounds per square inch pressure. One was equivalent to the standard A. P. I. filter press employed as described in A. P. I. Code 29, Section V, for measuring the fluid-loss rate of drilling muds. The other was a filter press generally similar to the standard A. P. I. press, except that it utilized a smaller sample cup and a smaller size of filter paper than the standard press, and was surrounded by a temperature-controlling water bath so that investigations could be carried on over a wide temperature range. In the results to follow, however, the fluid loss will be given in terms of the standard filter press, as the filtrate volume accumulated in thirty minutes, the results from the small filter press being converted by multiplying by a factor of four, found by experience to be a proper conversion factor. As both filter presses operated on the same principle, the results are accurately comparable regardless of which apparatus was used.

In the examples which follow, frequently only the results of tests at elevated temperatures are given. It is to be understood, however, that in all cases a given composition had an equal or lower water-loss rate at low temperatures than at the high temperatures. The real test of effectiveness, therefore, is shown by the high-temperature fluid loss, as it is at the high end of the temperature range that the effectiveness of sulfonated polystyrenes drops off. Water-cement ratios are in terms of gallons per 94-pound sack of dry cement.

*Examples*

An ordinary A. S. T. M. Type I Portland cement slurry with a water-cement ratio of 5.0 to 6.0 typically dehydrates completely, losing all of its free water, in less than 3 minutes at room temperature in the standard filter press. If water is added to make up for that being lost, as many as 3000 cc. of filtrate often accumulate in a 30-minute test.

By contrast an ordinary A. S. T. M. Type I Portland cement containing 2% by weight of Lustrex X-770-C, added in a wet mix, with a water-cement ratio of 6.0 showed a fluid-loss rate of only 36 cc. in 30 minutes at 160° F. Fluid loss from this same composition was even lower at lower temperatures, being only about 2 cc. in 30 minutes at 80° F. It should be noted in passing that 2% of X-770-C (80% active ingredient) is equivalent to about 1.6% of the pure resin.

Concentrations of less than the 2% of the crude X-770-C resin, in general, did not show desirably low fluid loss at high temperatures, although substantial reduction in water loss was evident at low temperatures. For example, ordinary Portland cement, A. S. T. M. Type I, with 1% Lustrex X-770-C, wet-mixed at a water-cement ratio of 5.75, showed at 80° F. a fluid loss of about 60 cc. in 30 minutes. At higher temperatures dehydration ordinarily occurred within the period of observation in the filter press, which was 7½ minutes for the small press. A concentration of only 0.75% of Lustrex X-770-C, equivalent to about 0.6% active resin, in Unaflo, wet-mixed at a water-cement ratio of 4.50 showed only about 24 cc. fluid loss at 80° F., but the slurry was somewhat thicker than desirable for easy pumping in well cementing.

In general, in mixing a slurry, it is desirable to use a minimum amount of water to attain the desired consistency for pumpability. For example, a test of Unaflo Slo-Set cement containing only 1% by weight of Lustrex X-770-C, wet-mixed with water at a ratio of 6.25, showed at 180° F. a fluid loss of 176 cc. in 30 minutes. When the water-cement ratio of this slurry was reduced to 5.25 gallons per sack, however, the water loss at 180° F. was cut in half amounting to about 88 cc. in 30 minutes. One percent Lustrex resin was often highly effective with this particular brand of cement, showing a water loss of only 16 cc. in 30 minutes at 160° F. (water-cement ratio 5.25 gallons per sack) ranging down to 10 cc. in 30 minutes for 80° F. temperature.

Also, with this cement, an increase in concentration of the water-loss agent was highly effective. Two percent Lustrex in Unaflo Slo-Set cement showed only 20 cc. water loss in 30 minutes at a temperature of 180° F., with a water-cement ratio of 5.75. Effectiveness at lower temperatures was even greater, ranging down to 8 cc. in 30 minutes at 80° F.

These sulfonated polystyrene resins are effective also when extenders are used with the cement to decrease the slurry weight or to add bulk and reduce the amount of cement necessary. Thus, a mixture of 50% Unaflo Slo-Set cement and 50% pozzolanic extender, such as "Pozmix S" marketed by the Halliburton Oil Well Cementing Company, plus 1% Lustrex X-770-C, based on the weight of the dry bulk solids (cement plus extender), wet-mixed at a water-cement ratio of 7.0 gallons per sack gave a fluid loss of only 28 cc. in 30 minutes at 180° F. This same mixture with a water-cement ratio of 5.5 gallons per sack gave a fluid loss somewhat lower, being only 20 cc. in 30 minutes at 180° F., but the slurry was undesirably thick. In this case an attempt to reduce the concentration of fluid-loss additive and increase the water-cement ratio was unsuccessful, as 0.5% Lustrex X-770-C with a 50-50 mixture of Unaflo and Pozmix S, wet-mixed at a water-cement ratio of 8.0, dehydrated very quickly at a temperature of 180° F.

That these sulfonated polystyrenes are compatible with different cements is shown by the fact that, upon substituting Trinity Inferno or Texcor slow-set cement in the mixture with Pozmix S, in place of the Unaflo, the slurries showed almost exactly the same fluid loss at 180° F. as did the 1% Lustrex X-770-C mixture with Unaflo. In all cases the resin was added in a wet mix, by prior addition to the slurry mixing water.

In general, the setting time and the set strength of these cements are not appreciably altered by the added resins. Two percent Lustrex X-770-P dry-mixed with Ideal A. S. T. M. Type II cement, with a water-cement ratio of 5.25 showed a water loss of 30 cc. in 30 minutes at 140° F. This slurry, set and cured at 120° F., showed a 24-hour tensile strength of 181 pounds per square inch. Two percent Lustrex X-770-P with ordinary A. S. T. M. Type I Portland cement showed a tensile strength of 270 pounds per square inch after curing 24 hours at 120° F. Two percent Lustrex X-770-P in Unaflo Slo-Set cement, cured at 120° F. for 72 hours, showed a tensile strength of 389 pounds per square inch. In all cases shrinkage and permeability of the set cement containing Lustrex were less than for the corresponding set neat cement without Lustrex.

In these cases where the resin was in the pure form, the setting times and strengths were almost the same as for neat cement. In other tests, cements plus crude Lustrex X-770-C resin in amounts up to 2% showed some decrease in 20-hour and 5-day tensile strengths. For example, 2% Lustrex X-770-C in ordinary Portland cement cured at 160° F. gave a 24-hour tensile strength of 148 pounds per square inch, increasing in 5 days to 181 pounds per square inch. For oil-well cementing purposes, however, such strengths as these are more than adequate.

Sulfonated polystyrenes are also effective in cements in the presence of bentonite. A 50-50 mixture of ordinary Portland cement and Pozmix S extender, plus 2% Lustrex X-770-C, 2% bentonite and 0.5% HR-4, which is a set retarder marketed by the Halliburton Oil Well Cementing Company, used in this case to reduce the gelling properties of the slurry, mixed with a water-cement ratio of 7.0 showed at 180° F. a fluid loss of about 36 cc. in 30 minutes. At higher water-cement ratios and without the gel-strength reducer these slurries tend either to dehydrate too quickly or to be too thick for proper pumpability in cementing wells.

Amounts of the resin additive can be readily varied to suit the temperature conditions anticipated during any given well-cementing operation. Thus, where ordinary Portland cement plus 2% of X-770-C resin dehydrated at 170° F. when mixed with a water-cement ratio of 6.75, the same cement with 3% of X-770-C mixed with a water-cement ratio of 9.5 showed only 18 cc. fluid loss in 30 minutes at this temperature.

Likewise, when an ordinary Portland cement plus 2% Lustrex X-770-C dehydrated at 175° F. a 5% concentration of Lustrex X-770-C reduced the fluid loss to only 52 cc. in 30 minutes at the same temperature. In these two cases the resin was added as a dry mix, and better results would probably have been obtained by adding it in a wet mix.

At some of the higher test temperatures, a slight tendency toward decomposition was noted, with some evolution of ammonia from the ammonium salt occurring. For this reason a more stable salt such as that formed with one of the alkali metals, for example, sodium, is to be preferred for use at the elevated temperatures, although the amount of ammonium salt decomposition at 180° F. is not enough to affect the cement properties noticeably.

Still further examples similar to the above could be given, but these are believed sufficient to show that the sulfonated polystyrenes are effective cement-slurry water-loss reducer in a wide variety of different cement compositions, in a concentrtaion range from less than 1% to 5% or more, preferably about 2%, by weight of the dry bulk solids in the slurry. Furthermore this material tends to retain its effectiveness at high as well as low temperatures.

By comparison pregelatinized starch is effective only at high temperatures and has a marked inhibiting or retarding effect upon the setting or the setting time of the cement slurry. The resins of the present invention are much easier to incorporate in a cement slurry than polyvinyl alcohol, for example, which exhibits a decided tendency to cause foaming, besides being effective primarily only at low temperatures.

The effectiveness of these sulfonated polystyrene resins for preventing water loss from cement slurries appears to correlate with their ability to make viscous solutions in water, which increases both with concentration in a solution and with average molecular weight of the styrene polymer. This is not the sole attribute necessary, however, as many substances which dissolve and form viscous water solutions have been tested and found completely worthless for use in cement compositions of the type contemplated herein.

Nevertheless it does indicate that water-soluble sulfonated polystyrenes of molecular weights greater than 70,000 should be more effective in equal concentrations, or equally effective in smaller concentrations, than the sulfonated polymers of weight 70,000 or less. Thus, a cement slurry with 0.5% of a sulfonated 200,000-weight polystyrene might have as low a fluid-loss rate as one with 1.0% or 2.0% of the 70,000-weight polymers described in the above examples. To some degree, however, this greater effectiveness may be offset by the lower water solubility of the high-weight polymers.

Although extensive tests have been performed with only the ammonium salts of the sulfonated polystyrene resins, the fact that in other applications the alkali metal, alkaline earth metal, ammonia, or amine salts of these resins are all about equally effective indicates that they will likewise be satisfactory here. In view of the foregoing description, other and further modifications and variations of the composition of the present invention will be apparent to those skilled in the art. The invention, therefore, should not be considered as limited to the examples and details set forth above, but its scope is properly to be ascertained by reference to the appended claims.

I claim:

1. A low-water-loss cement composition comprising hydraulic cement and a sulfonated polystyrene in an amount between about 0.5% and 5.0% by weight of the dry cement bulk solids, said polystyrene being a sulfonate of a styrene polymer having a molecular weight of at least 50,000 and containing about 1.2 sulfonic acid groups per styrene unit, and said sulfonated polystyrene being present as at least one of the group consisting of alkali metal and ammonium salts.

2. A composition according to claim 1 in which said hydraulic cement is Portland cement.

3. A low-water-loss cement composition comprising hydraulic cement and from about 0.5 to about 5.0 percent, based on the dry cement, of a salt of sulfonated polystyrene, said polystyrene before sulfonation having a molecular weight between about 10,000 and about 400,000, said sulfonated polystyrene containing between about 0.7 and about 2.0 sulfonic acid groups per styrene unit and said salt being selected from the group consisting of ammonium and alkali metal salts.

4. The composition of claim 3 in which said salt is the ammonium salt.

5. The composition of claim 3 in which said salt is the sodium salt.

6. A low-water-loss cement composition comprising Portland cement and from about 1.0 to 2.0 percent, based on the dry cement, of the ammonium salt of sulfonated polystyrene, said polystyrene before sulfonation having a molecular weight of about 70,000 and said sulfonated polystyrene containing about 1.2 sulfonic acid groups per styrene unit.

7. A low-water-loss cement composition comprising Portland cement and from about 1.0 to 2.0 percent, based on the dry cement, of the sodium salt of sulfonated polystyrene, said polystyrene before sulfonation having a molecular weight of about 70,000 and said sulfonated polystyrene containing about 1.2 sulfonic acid groups per styrene unit.

8. The method of forming a low-water-loss cement slurry comprising dissolving in water a quantity of a salt of sulfonated polystyrene to form a viscous solution and then combining said solution with dry Portland cement to form a fluid slurry, said polystyrene before sulfonation having a molecular weight between about 10,000 and about 400,000, said sulfonated polystyrene containing between about 0.7 and about 2.0 sulfonic acid groups per styrene unit, said salt being selected from the group consisting of ammonium and alkali metal salts and said salt being present in a concentration between about 0.5 and about 5.0 percent based on the dry cement.

9. The method of claim 8 in which said salt is the ammonium salt.

10. The method of claim 8 in which said salt is the sodium salt.

11. The method of forming a low-water-loss cement slurry comprising dissolving in water a quantity of an ammonium salt of sulfonated polystyrene containing about 1.2 sulfonic acid groups per styrene unit to form a viscous solution and then combining said solution with dry Portland cement to form a fluid slurry, said polystyrene before sulfonation having a molecular weight of about 70,000 and said salt being present in a concentration between about 1.0 and about 2.0 percent based on the dry cement.

12. The method of forming a low-water-loss cement slurry comprising dissolving in water a quantity of a sodium salt of sulfonated polystyrene containing about 1.2 sulfonic acid groups per styrene unit to form a viscous solution and then combining said solution with dry Portland cement to form a fluid slurry, said polystyrene before sulfonation having a molecular weight of about 70,000 and said salt being present in a concentration between about 1.0 and 2.0 percent based on the dry cement.

References Cited in the file of this patent

UNITED STATES PATENTS

| | | |
|---|---|---|
| 2,612,485 | Baer | Sept. 30, 1952 |
| 2,646,846 | Cutforth | July 28, 1953 |
| 2,650,905 | Fordyce et al. | Sept. 1, 1953 |
| 2,733,995 | Robinson | Feb. 7, 1956 |